May 21, 1957

J. J. FORRER 2,792,859

APPARATUS FOR END-MATCHING LUMBER

Filed July 28, 1953

2 Sheets-Sheet 1

INVENTOR:
John J. Forrer,

BY Ross C. Hurvey

ATTORNEY

May 21, 1957  J. J. FORRER  2,792,859
APPARATUS FOR END-MATCHING LUMBER
Filed July 28, 1953  2 Sheets-Sheet 2
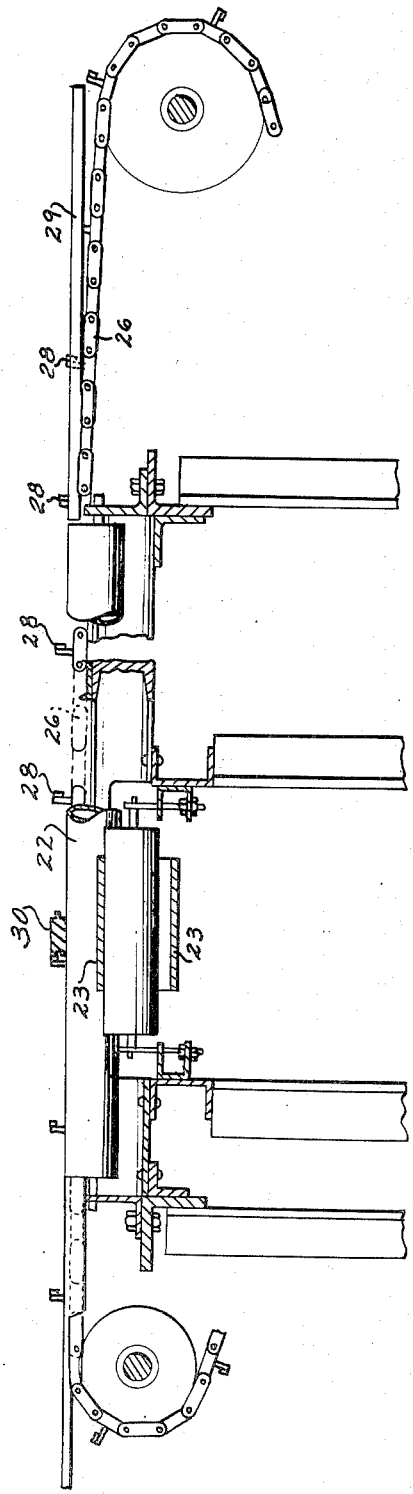
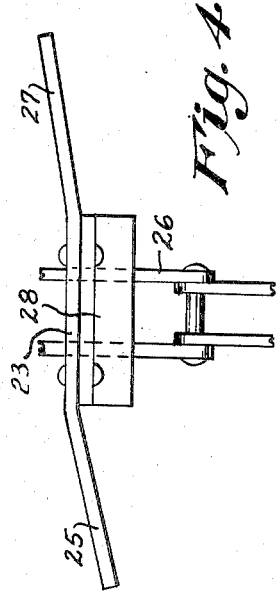
INVENTOR:
John J. Forrer
BY Ross C. Hurrey
ATTORNEY

United States Patent Office 2,792,859
Patented May 21, 1957

2,792,859

APPARATUS FOR END-MATCHING LUMBER

John J. Forrer, Franklin, Va., assignor to Union Bag-Camp Paper Corporation, a corporation of Virginia Application July 28, 1953, Serial No. 370,662

2 Claims. (Cl. 144—91)

It is an object of this invention to provide a tongue and groove end-matching machine to handle wood flooring in which random length pieces, having passed through an initial machine which cuts either a tongue or a groove, are automatically conveyed and properly placed and oriented for the action of the second unit which performs the complementary operation, i. e., either groove or tongue.

It is a further object of this invention to provide a machine as aforesaid in which the conveying means from the first unit to the second unit is synchronized with the feeding means of each unit.

Figure 1:
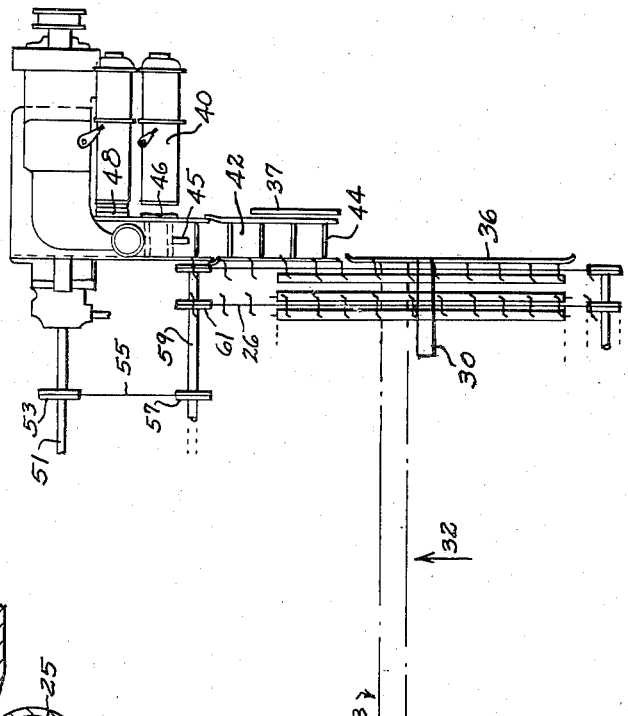
Figure 3:
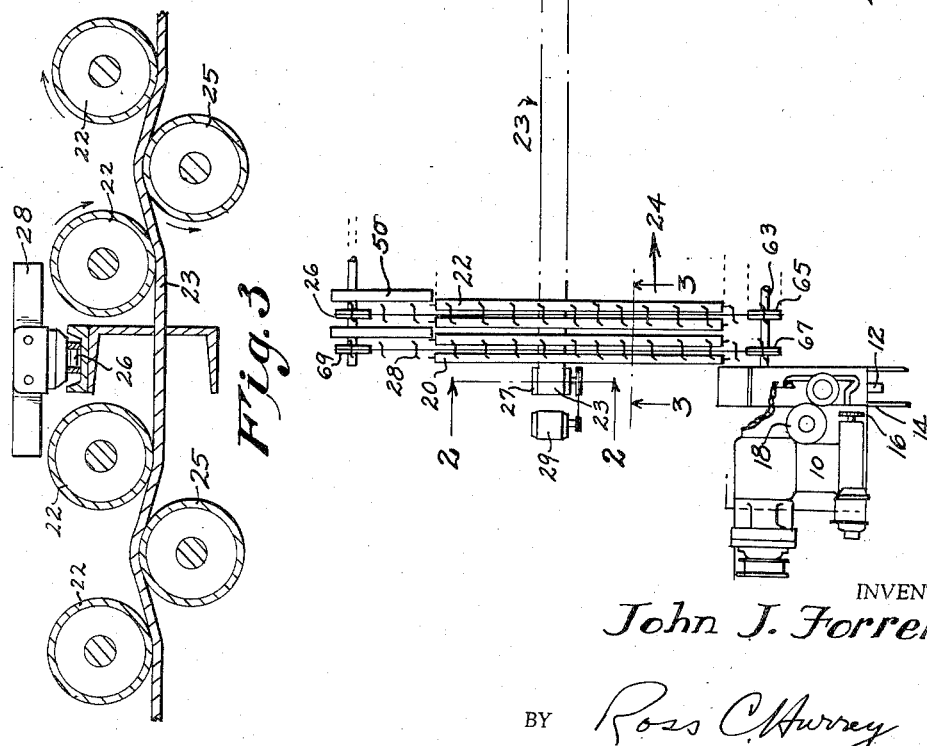

The above and other objects will be made clear from the following detailed description taken in connection with the annexed drawings, in which:

Figure 1 is a plan view of the entire machine;
Figure 2 is a section on the line 2—2 of Figure 1;
Figure 3 is a section on the line 3—3 of Figure 1; and
Figure 4 is a detail of one of the conveyor lugs.

The mechanical details of the cutter heads are adequately disclosed in Patent No. 1,095,233 and the details of trimming, feeding and guiding at the individual heads are adequately disclosed in Patent No. 2,581,947 for which reason the details disclosed herein are confined only to those necessary to an understanding of the present invention.

Prior to the present invention, flooring passed through the first unit and dropped on a belt on which it was conveyed to an operator who arranged the several pieces to meet the individual conveyor of the second unit. Since the pieces are in disorder and of random length on the belt and since the opposite end of each piece must individually be brought to gauge for the second unit the operator must be well trained and usually one or more reliefs were required to maintain speed and withstand fatigue. The pieces to be cut range from around 16 feet to as little as a foot in length and must be operated on at opposite ends. Accordingly, heretofore at least two operators have been necessary, one of them acting to align the ends of the board for presentation to the second unit and the other advancing the short pieces to a point where the first operator can grasp them. The present invention disposes entirely of this manual operation and ensures the pieces being presented to the second unit in proper sequence and spacing and properly gauged.

Referring now to Figure 1 there is shown a grooving unit 10 fed by a conveyor 12, all as described in Patent No. 2,581,947. The pieces entering the groover 10 are pressed against a gauge plate 14 and pass across a saw 16 which squares up the ends. The pieces then pass across a cutter 18 which forms the end groove. From the groover 10 the pieces of flooring pass to a compound conveyor generally designated 20. This conveyor is made up of a series of driven rolls 22 which rotate in the longitudinal direction indicated by the arrow 24. Intermediate the rolls 22 are a series of positively driven chain conveyors 26, each chain carrying a series of lugs 28.

The spacing of the chains 26 is such that the space between any series of lugs 28 is less than the length of the shortest piece of flooring which may reasonably be expected to be encountered.

It will be seen that a piece of flooring 30 will be driven by the rolls 22 in a longitudinal direction indicated by the arrows 24 and will simultaneously be advanced by a set of lugs 28 in the direction of the arrow 32. The sets of lugs 28 are spaced and synchronized with the lugs 34 on the conveyor 12 of the groove 10. As used herein the term "longitudinal direction" means the direction parallel to the length of the strips (arrow 24) while the term "lateral direction" means the direction at substantially right angles to the longitudinal direction (arrow 32).

With the flooring 30 moving simultaneously in the direction of both arrows 24 and 32 it is ultimately brought with its untreated end against a bumper plate 36 at the right hand end of Figure 1. Obviously a very long piece of flooring will strike the bumper plate near the lower right corner of the conveyor in Figure 1 while a short piece such as illustrated at 30 will strike the gauge plate much nearer the tongue end-matcher 40. The tongue end-matcher 40 has a conveyor 42 similar to the conveyor 12 of the groover 10. The conveyor 42 has a series of lugs 44 synchronized in time and spacing with the lugs 28. The lugs 44 carry the piece 30 past a squaring-up saw 46 and then between cutters 48.

As will be seen from Figure 4 each lug 28 comprises a central portion 23, an end portion 25 and an end portion 27. The end portion 25 is inclined in the trailing direction of the advance of the lugs 28 while the end portion 27 is inclined in the leading direction of advance of the lugs 28. The reason for the trailing inclination of the end portion is to ensure against short pieces being mixed by a particular set of lugs 28. The purpose of the leading inclination of the end 27 is to ensure that if two pieces reach the conveyor in close proximity one will be shoved ahead of one set of lugs and will not be permitted to fall with two pieces between a single set of lugs. It is not yet demonstrable that the leading inclination of the end 27 makes any particluar or specific contribution to the efficiency of the machine and method but the trailing inclination of the end 25 definitely does contribute to overall efficiency.

The overall length of the conveyor 20 is slightly longer than the longest piece of flooring reasonably to be expected. The lineal feed rate of the lugs 34, 28 and 44 is equal and is determined as optimum for the cutting operations at the heads 10 and 40 and, of course, this feed rate must be exactly equalled by the lugs 28. The lineal feed rate of the rolls 22 must be sufficient to carry the shortest piece of flooring which may reasonably be expected from the lower left hand corner of the conveyor as shown in Figure 1 to the upper right hand corner in the time it takes a set of lugs 28 to travel the length of the rolls 22. In usual practice, therefore, the lineal feed rate of the rolls will be from three to four times the lineal feed rate of the lugs 28. Short pieces acquire considerable velocity in traveling across the machine in the direction of the arrow 24 and this velocity may be sufficiently great to cause bouncing when the pieces hit the bumper plate 36. For this reason the gauge plate 37 is mounted outside the conveyor 42 of the tongue end-matcher 40 so that there will be an opportunity for the rolls 22 to re-advance the pieces from the bumper plate to the gauge plate.

It is important that the pieces leave the influence of the lugs 28 before entering the control of the end piece matcher lugs 44 and the cooperating hold-down bar 45. In the longer pieces particularly there may be sufficient warp so that the board is not properly presented by the lugs 28 alone. The lugs 44 are squarely normal to the plane of the trimming saw and the friction of the hold-down bar 45 squares the end of the board against the lugs 44, assuring optimum presentation of the end of the board to the trimming saw. Sometimes this squaring-up action tends to move the free end of the board rearwardly, which movement would be interfered with by the lugs 28. For this reason, as shown in Figure 2, the lugs 28 are made to disappear downwardly below the supporting rods 29 so that by the time lugs 44 bring the board into contact with the hold-down bar 45 the free end of the board is freely shiftable. As shown particularly in Fig. 2 the chains 26 carrying the lugs 28 move downward as the chains 26 leave the end of rollers 22 and become ineffective at the time lugs 44 bring the board into contact with the hold-down bar 45.

It is, of course, essential that the spacing of the lugs on the several conveyors be the same and that all of the conveyors except, of course, the rollers 22 operate at the same lineal speed. Moreover, the lugs 28 must register with the lugs of the leading unit 10 and with the lugs of the second unit 40. To assure this, power is applied only to one of the units and is shown applied to the second unit 40. A shaft 51 is keyed into this unit. Sprockets 53 are keyed to the shaft 51 and by means of chains 55 drive sprockets 57 on a shaft 59. Additional sprockets 61 are keyed to the shaft 59 and drive the conveyors with their lugs 28. At the opposite end of the machine a shaft 63 carries a series of sprockets 65 which complete the lug-carrying chains. These sprockets preferably are not keyed to the shaft 63 but merely float. At the end of shaft 63 adjacent the unit 10 the extreme sprocket 67 is keyed to the shaft 63 as is its complementary sprocket 69 on the shaft 59. The shaft 63 is utilized to drive the conveyor of unit 10, thus assuring registry and synchronism of the several conveyors.

As best shown in Figure 3 rolls 22 are driven by a belt 23 which passes over tensioning rolls 25 and is driven by a pulley 27 which receives power from a motor 29.

It will be seen from the foregoing that a method and apparatus have been provided, capable of handling the entire range of lengths which are apt to be encountered and to do this rapidly and with a minimum of labor.

I claim:

1. Apparatus for providing opposite ends of consecutive strips of flooring, of random lengths, with matching tongues and grooves, said apparatus comprising a pair of opposed cutter heads, one of said heads being equipped to form grooves and the other of said heads being equipped to form tongues; said heads being spaced one from the other both longitudinally and laterally; each head having a conveyor and a gauge plate for bringing consecutive strips of flooring into proper registry with the head; the conveyor of each head rigidly gripping each strip presented thereto; a series of constantly driven rolls for transporting the strips longitudinally from one head to the other; a series of constantly driven, lug bearing chains intermediate said rolls for transporting said strips laterally, the lugs of the several chains being mutually aligned longitudinally of the strips, the rate of advance of said lugs being substantially synchronized with the rates of advance of the conveyors of the two heads and means adjacent the second head for rendering ineffective said lugs as the conveyor of that head takes control of each strip.

2. A machine as set forth in claim 1 in which the strip receiving end of each lug is inclined in the trailing direction.

References Cited in the file of this patent

UNITED STATES PATENTS

| | | |
|---|---|---|
| 386,701 | Garland | July 24, 1888 |
| 569,611 | Burnham | Oct. 20, 1896 |
| 1,082,791 | Bengler | Dec. 30, 1913 |
| 1,095,233 | Rose | May 5, 1914 |
| 1,095,234 | Rose | May 5, 1914 |
| 1,471,246 | Daniels | Oct. 16, 1923 |